United States Patent
Danielsen et al.

(10) Patent No.: US 12,410,773 B2
(45) Date of Patent: Sep. 9, 2025

(54) SYSTEM AND METHOD FOR USE OF A TUNABLE MECHANICAL MASS DAMPER TO REDUCE VIBRATIONS IN WIND TURBINE BLADES IN A LOCKED OR IDLING CONDITION OF THE ROTOR HUB

(71) Applicant: General Electric Company, Schenectady, NY (US)

(72) Inventors: Darren John Danielsen, Simpsonville, SC (US); Charles Erklin Seeley, Niskayuna, NY (US); Gregory Edward Cooper, Greenfield Center, NY (US); Wilhelm Ramon Hernandez, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 833 days.

(21) Appl. No.: 17/685,473

(22) Filed: Mar. 3, 2022

(65) Prior Publication Data
US 2023/0279838 A1     Sep. 7, 2023

(51) Int. Cl.
*F03D 9/25*     (2016.01)
*F03D 7/02*     (2006.01)
(Continued)

(52) U.S. Cl.
CPC .............. *F03D 7/0296* (2013.01); *F03D 9/25* (2016.05); *F03D 15/00* (2016.05); *H02K 7/02* (2013.01);
(Continued)

(58) Field of Classification Search
CPC ........ F03D 7/0268; F03D 1/0675; F03D 9/25; F03D 15/00; F03D 7/0296; F03D 7/0298;
(Continued)

(56) References Cited

U.S. PATENT DOCUMENTS 7,854,589 B2    12/2010    Nielsen et al.
8,672,107 B2    3/2014    Ivanco
(Continued)

FOREIGN PATENT DOCUMENTS

EP    0853197 A1    7/1998
EP    2357356 A2    8/2011
(Continued)

OTHER PUBLICATIONS

Nakano Mamoru, Dynamic Vibration Reduce Using Automatic Controlled Damping Device, Feb. 11, 1987, JP 62251542 (English Machine Translation) (Year: 1987).*
(Continued)

*Primary Examiner* — Alexander A Singh
(74) *Attorney, Agent, or Firm* — Dority & Manning, P.A.

(57) ABSTRACT

A system and method are provided for reducing vibrations and loads in one or more rotor blades on a rotor hub of a wind turbine when the rotor hub is in a locked or idling condition. A mass damper is attached at a fixed location on one or more of the rotor blades and is maintained on the rotor blades during the locked or idling condition of the rotor hub. The mass damper includes a movable mass component that is responsive to changes in the vibrations or oscillations induced in the rotor blades during the locked or idling condition of the rotor hub.

16 Claims, 6 Drawing Sheets

(51) Int. Cl.
*F03D 15/00* (2016.01)
*H02K 7/02* (2006.01)
*H02K 7/116* (2006.01)

(52) U.S. Cl.
CPC ........ *H02K 7/116* (2013.01); *F05B 2220/706* (2013.01); *F05B 2260/964* (2013.01)

(58) Field of Classification Search
CPC . H02K 7/116; H02K 7/02; F16F 7/116; F16F 7/1022; F16F 7/1028; F05B 2220/706; F05B 2260/964; F05B 2260/96; Y02E 10/72
USPC .......................................................... 310/74
See application file for complete search history.

(56) References Cited

U.S. PATENT DOCUMENTS

| | | |
|---|---|---|
| 9,316,202 B2 | 4/2016 | Bech |
| 10,619,699 B2 | 4/2020 | Ivanco |
| 11,572,868 B1 * | 2/2023 | Seeley .................. F03D 1/0675 |
| 12,092,082 B1 * | 9/2024 | Snow .................... F03D 7/0298 |
| 2010/0239426 A1 * | 9/2010 | Westergaard ........... F03D 80/00 |
| | | 416/226 |
| 2012/0107116 A1 * | 5/2012 | Obrecht .................. F03D 13/25 |
| | | 416/1 |
| 2018/0252287 A1 | 9/2018 | Mitsch |
| 2019/0024535 A1 | 1/2019 | Mitsch |
| 2021/0079896 A1 | 3/2021 | Herrig et al. |

FOREIGN PATENT DOCUMENTS

| | | |
|---|---|---|
| EP | 3795824 A1 | 3/2021 |
| JP | 62251542 * | 11/1987 |
| WO | WO2021/0079896 A1 | 3/2021 |

OTHER PUBLICATIONS

EP Search Report for EP application No. 23159701.4, 9 pages.

* cited by examiner

SYSTEM AND METHOD FOR USE OF A TUNABLE MECHANICAL MASS DAMPER TO REDUCE VIBRATIONS IN WIND TURBINE BLADES IN A LOCKED OR IDLING CONDITION OF THE ROTOR HUB

FIELD

The present disclosure relates in general to wind turbine power generating systems, and more particularly to systems and methods for damping vibrations and loads in wind turbines, particularly when the rotor hub is non-operational in a locked or idling condition.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades, wherein the rotation generates a torque that is transmitted through a rotor shaft to a generator, either directly ("directly driven") or through the use of a gearbox. This way, the generator produces electricity which can be supplied to the electrical grid.

There is a trend to make wind turbine blades increasingly longer to capture more wind and convert the energy of the wind into electricity. This results in the blades being more flexible and more prone to aero-elastic instabilities, e.g., vibrations of the blades that can also lead to blade oscillations. Vibrating blades create risk of major potential damages in the entire wind turbine.

When the wind turbine is in operation, a wind turbine controller may operate directly or indirectly any auxiliary drive system such as a pitch system or a yaw system to reduce loads on the blades. This way, vibrations of the blades may be counteracted. However, the problem of aero-elastic instabilities can be serious as well in circumstances when the wind turbine is in stand-still conditions, either idling or locked, wherein the blades are susceptible to edgewise oscillations.

At least two types of vibrations may happen during stand-still conditions. The first one is vortex induced vibration (VIV) at certain angles of attack and may or may not include cross flow vortices shed at frequencies close to blade eigen frequencies or system frequencies. The second one is stall induced vibration (SIV) when the angle of attack is close to stall angles and the flow interaction may lead to blade vibrations. The angle of attack may be understood as a geometrical angle between a flow direction of the wind and the chord of a rotor blade. There may also be cross flow components to the flow.

The vortex and stall induced vibrations are phenomena that, if not adequately designed or compensated for, can lead to blade failure or accelerate blade damage.

When the rotor is locked against rotation, for instance due to installation, commissioning, or maintenance tasks, the blades can experience aero-elastic instabilities, such as the VIV and SIV vibrations. Blades are susceptible to these vibrations when angles of attack are within certain ranges. Because the rotor is locked, rotation of the rotor cannot be used to reduce or damp these vibrations.

A current solution to the cited problems includes the use of aerodynamic devices attached to the blades to reduce vortices and/or increase damping. However, this solution may increase costs and time for installation and removal of such devices.

Another current practice for wind turbines when not making power includes setting the pitch angle of the rotor blades to substantially 90 degrees when the rotor is yawed into the wind and prevented from rotating by means of a locking pin. This particular pitch angle may reduce loads on the blades, at least with some wind conditions. However, the locking pin may suffer from higher loads when the pitch angle is set at the weathervane position and, even in this position, not all vibrations may be avoided, particularly if the wind direction changes over time.

U.S. Pat. No. 9,316,202 proposes a method and system to guard against oscillations of the wind turbine blades when the rotor is locked or idling at low speeds that involves attachment of a releasable cover to the blades that provides a non-aerodynamic surface for a region of the blade. The blade cover is described as a sleeve of a net-like material that can be positioned on the blade either before installation or in the field by service engineers using guidelines.

The present disclosure provides an alternate effective means to reduce or prevent vibrations or oscillations in the wind turbine blades when the wind turbine is in a non-operational mode with the rotor hub unable to yaw and locked or idling via use of unique vibration dampers that will provide benefits in cost, time and ease of installation, and effectiveness.

BRIEF DESCRIPTION

Aspects and advantages of the invention will be set forth in part in the following description, or may be obvious from the description, or may be learned through practice of the invention.

The present disclosure encompasses a method for preventing or at least reducing vibrations and loads in one or more rotor blades on a rotor hub of a wind turbine when the wind turbine is in a non-operational mode with the rotor hub in a locked or idling condition. This mode of the wind turbine may occur, for example during installation, repair, maintenance, disconnection from a grid, or any other scenario that calls for the rotor hub to be locked against rotation (i.e., at a standstill) or allowed to idle.

The method includes removably attaching a mass damper at a fixed location on one or more of the rotor blades, for example at a location closer to a tip of the blades. The mass damper is maintained on the rotor blades during the locked or idling condition of the rotor hub and is removed prior to placing the wind turbine back into an operational mode. The mass damper includes a movable mass component that is responsive to changes in vibrations or oscillations induced in the rotor blades during the locked or idling condition.

The mass damper may be configured to automatically tune to an excitation frequency of the rotor blade or a system frequency during the locked or idling condition, wherein these frequencies can change with varying operating conditions.

The step of attaching the mass damper may include fixing clamping shells over the rotor blade at the fixed location, the clamping shells conforming to a shape of the pressure side and suction side surfaces of the rotor blade and extending beyond a leading and trailing edge of the rotor blade in a chord-wise direction. The mass damper can be mounted onto one of these clamping shells.

In a particular embodiment, the mass damper includes a flywheel connected to a rotation damper, wherein the step of remotely tuning the mass damper includes establishing and controlling a counter-torque exerted by the rotation damper against rotation of the flywheel.

In one embodiment, the mass damper includes a frame that is movable linearly along a chord-wise stroke length relative to the rotor blade. The flywheel may be in geared engagement with a track gear that runs linearly along the stroke length across the rotor blade, wherein the flywheel is rotationally driven as the frame moves along the stroke length. The flywheel may be coupled to a shaft and in geared engagement with a track gear so as to be rotationally driven as the frame moves along the stroke length. The rotation damper may be mounted on the frame and in geared engagement with the flywheel, wherein the counter-torque exerted by the rotation damper is proportional to a rotational velocity of the flywheel.

In an embodiment, the tunable mass damper may include a ballast weight mounted to the frame and thus movable with the frame along the stroke length.

In a certain configuration, the frame and the track gear are located within a housing, the housing stationarily fixed on the rotor blade. The flywheel may be geared directly or indirectly to the track gear. For example, the outer circumference of the flywheel may have a gear surface that is engaged directly with the track gear.

In a particular embodiment, the rotation damper may include an electrical generator in geared engagement with and driven by the flywheel, wherein an electrical output of the generator is directly proportional to the rotational velocity of the flywheel and produces the counter-torque against rotation of the flywheel. In this embodiment, the rotation damper can be tuned by varying an electrical resistive load placed on the generator to change the counter-torque exerted by the generator at a given rotational speed of the flywheel. For example, the load may include a variable and remotely-controlled resistor or other type of variable resistive load in communication with a controller for changing the effective load placed on the generator.

The present invention also encompasses a wind turbine configured for reducing vibrations and loads in the rotor blades mounted on a rotor hub during a non-operational mode of the wind turbine. In such non-operational mode, the rotor hub is in a locked or idling condition and the wind turbine includes a tunable mass damper attached at a fixed location on one or more of the rotor blades. The mass damper includes a movable mass component that is responsive to changes in vibrations or oscillations in the rotor blades during the locked or idling condition of the rotor hub.

In a particular embodiment, the mass damper is configured to automatically tune to an excitation frequency of the rotor blade or a system frequency as the vibrations or oscillations in the rotor blades change.

In a particular embodiment, the wind turbine includes an attachment system that removably attaches the tunable mass damper to the rotor blade. This system may include clamping shells placed over the rotor blade at the fixed location. The clamping shells are at opposite sides of the rotor blade and conform to a shape of the pressure side and suction side surfaces of the rotor blade. The clamping shells may include flanges that extend beyond a leading and trailing edge of the rotor blade in a chord-wise direction, wherein the flanges are bolted or otherwise fixed together to secure the clamping shells on the rotor blade. The mass damper many be mounted onto one of the clamping shells.

In a certain embodiment of the wind turbine, the mass damper includes a flywheel connected to a rotation damper that exerts an adjustable counter-torque on the flywheel proportional to a rotational velocity of the flywheel.

The tunable mass damper may include a frame that is movable linearly along a chord-wise stroke length relative to the rotor blade, wherein the flywheel is in geared engagement with a track gear that extends linearly along the stroke length and is rotationally driven as the frame moves along the stroke length. The rotation damper may be mounted on the frame and in geared engagement with the flywheel, wherein the counter-torque exerted by the rotation damper is proportional to a rotational velocity of the flywheel.

In a particular embodiment, the mass damper may include a ballast weight mounted to the frame so as to move linearly along the stroke length.

The components of the mass damper, including the frame, track gear, flywheel, and rotation damper may be configured within a housing that is stationarily fixed on the rotor blade.

In certain embodiments, the rotation damper may include an electrical generator in geared engagement with and driven by the flywheel, wherein an electrical output of the generator is directly proportional to the rotational velocity of the flywheel and produces the counter-torque. An adjustable electrical load can be placed on the generator, wherein the mass damper is tuned by adjusting the electrical load. For example, the adjustable electrical load may include a variable resistor or other variable resistive load configuration that is remotely and electronically adjusted by a controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
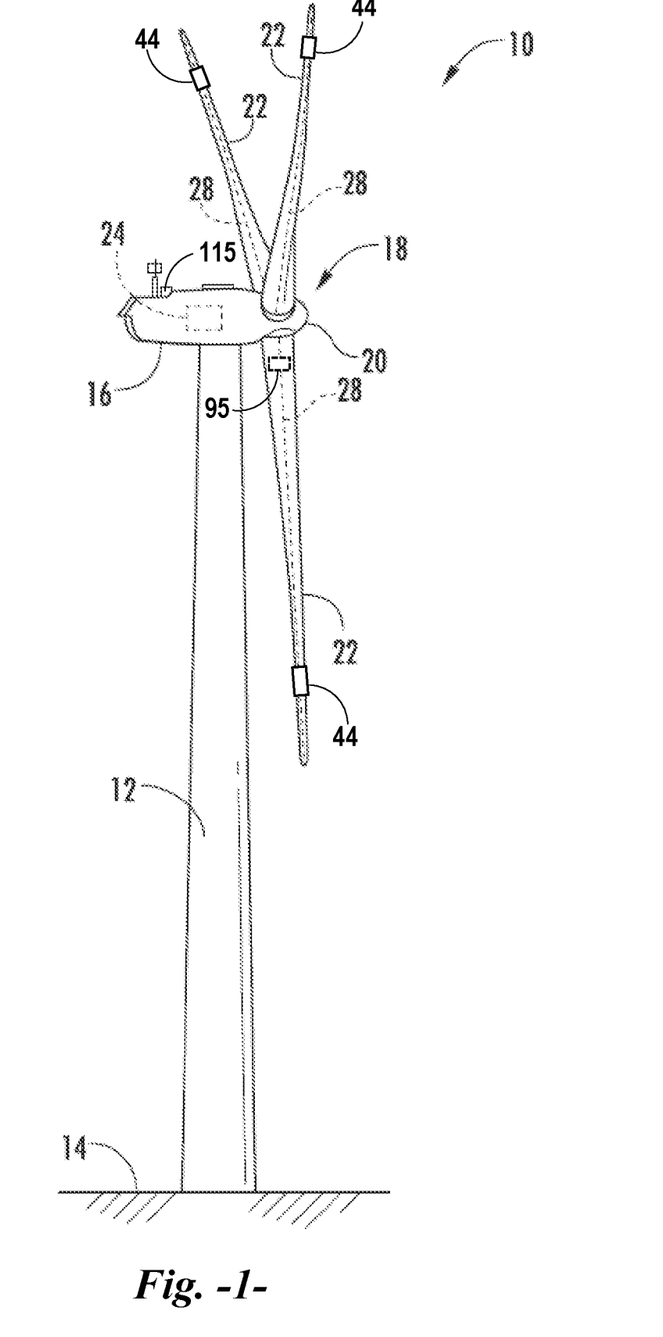
FIG. 1 illustrates a perspective view of a wind turbine.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 positioned within the nacelle 16 to permit electrical energy to be produced.

The wind turbine 10 may also include a wind turbine controller 24 centralized within the nacelle 16. However, in other embodiments, the controller 24 may be located within any other component of the wind turbine 10 or at a location outside the wind turbine 10. Further, the controller 24 may be communicatively coupled to any number of the components of the wind turbine 10 in order to control the operation of such components and/or implement a corrective or control action. For example, the controller 24 may be in communication with individual pitch drive systems associated with each rotor blade 22 in order to pitch such blades about a respective pitch axis 28. As such, the controller 24 may include a computer or other suitable processing unit. Thus, in several embodiments, the controller 24 may include suitable computer-readable instructions that, when implemented, configure the controller 24 to perform various different functions, such as receiving, transmitting and/or executing wind turbine control signals. Accordingly, the controller 24 may generally be configured to control the various operating modes (e.g., start-up or shut-down sequences), de-rating or up-rating the wind turbine, and/or individual components of the wind turbine 10.

The present disclosure relates to situations wherein the wind turbine 10 is non-operational (e.g., not producing electrical power) and the rotor 18 (and thus the rotor hub 20) is either locked against rotation or is left to idle, for instance due to installation, commissioning, maintenance tasks, repair, or any other reason. The controller 24 may remain communicatively coupled to at least the pitch drive system in the locked or idling state of the rotor 18. Alternatively, the "controller" function may also be provided by a separate dedicated controller during the locked or idling state of the rotor. This dedicated controller may be configured to operate autonomously, i.e., independently from the wind turbine controller 24, at least in some operating conditions, and may be able to perform tasks such as receiving and emitting signals and processing data when the wind turbine controller 24 is otherwise unavailable.

The wind turbine 10 of FIG. 1 may be placed in an offshore or onshore location.

As used herein, the term "controller" refers not only to integrated circuits referred to in the art as being included in a computer, but also refers to a microcontroller, a microcomputer, a programmable logic controller (PLC), an application specific integrated circuit, and other programmable circuits. The controller is also configured to compute advanced control algorithms and communicate to a variety of Ethernet or serial-based protocols (Modbus, OPC, CAN, etc.). Additionally, a memory device(s) configured with the controller may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 402, configure the controller to perform the various functions as described herein.

Referring again to FIG. 1, each of the rotor blades 22 includes a mass damper 44 in accordance with aspects of this disclosure mounted thereon, for example at a fixed location that is closer to the blade tip rather than the blade root.

Figure 2:
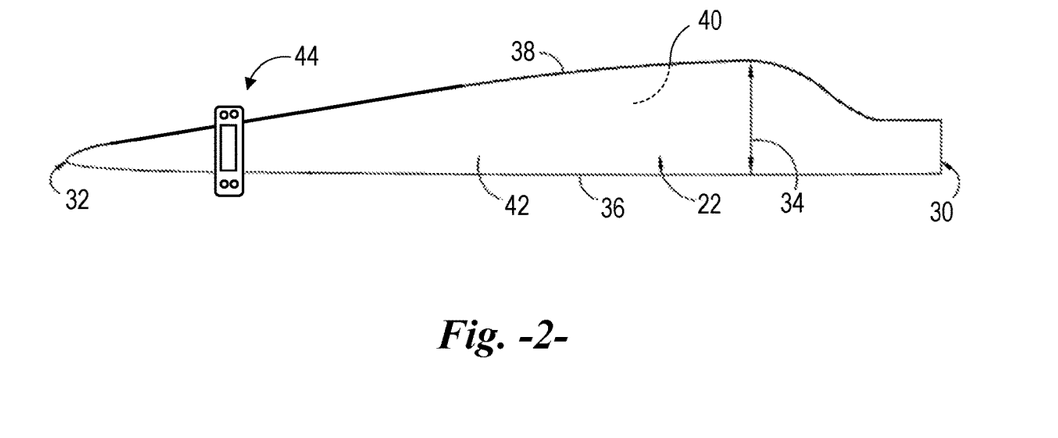
FIG. 2 illustrates a simplified view of a wind turbine blade equipped with a tunable mass damper.

FIG. 2 is a diagram view of a conventional rotor blade 22 that includes an opposite blade root 30, leading edge 36, trailing edge 38, suction side 42, and pressure side 40. The chord-wise dimension 34 of the blade 22 is also indicated. The mass damper 44 is mounted chord-wise onto the suction side 42 of the blade 22 generally adjacent to the blade tip 32. The mass damper could just as well be mounted onto the suction side 42 of the rotor blade 22. The mass damper 44 is explained in greater detail below.

Figure 3:
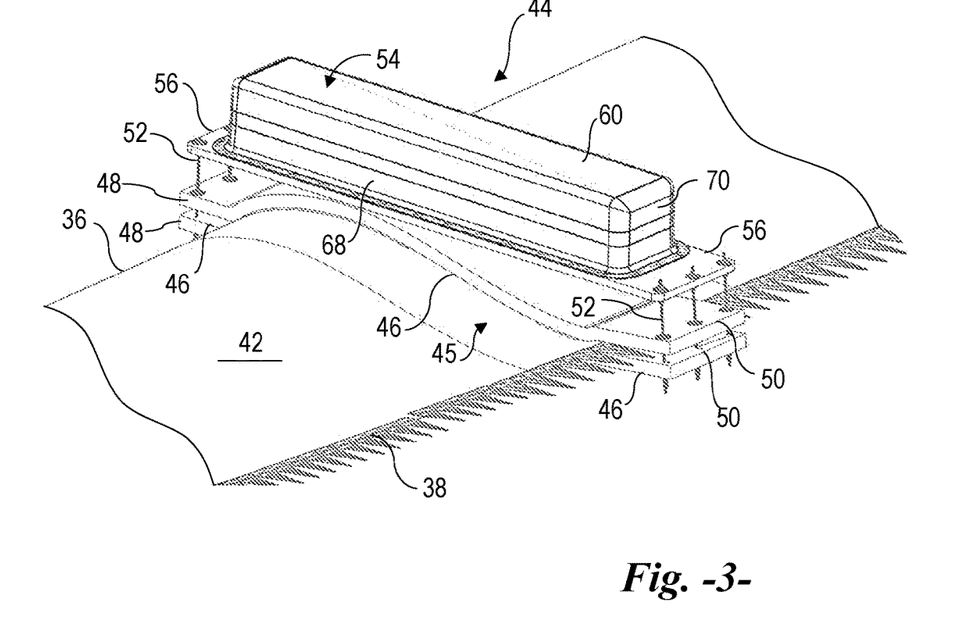
FIG. 3 is a perspective view of a tunable mass damper mounted onto a wind turbine blade.

FIG. 3 is a perspective external view of the mass damper 44 on the rotor blade 22, and particularly illustrates an embodiment of an attaching system 45 for fixing the mass damper on the blade. The attaching system includes opposite clamping shells 46 that conform to the blade's outer pressure side surface 40 and suction side surface 42. The clamping shells 46 extend across the chord-wise width of the rotor blade 22 and include a leading-edge flange 48 and a trailing edge flange 50. The mass damper 44 includes a base 56 that extends above one of the clamping shells 46 between the flanges 48, 50. The base 56 is bolted to the flanges with bolts 52, wherein the bolts 52 also serve to bolt the opposite flanges 48 together as well as the opposite flanges 50.

It should be appreciated that the mass damper 44 may be mounted to the rotor blade using any suitable nonpermanent attaching system, including mechanical fasteners, adhesives, inflatable devise, and so forth.

The mass damper 44 includes a housing 54 mounted onto the base 56, wherein the working components of the mass damper 44 are contained within the housing 54, as described in greater detail below. The housing 56 includes side walls 68, end walls 70, and a top 60. It should be appreciated that the housing 56 may have any geometric shape.

Figure 4:
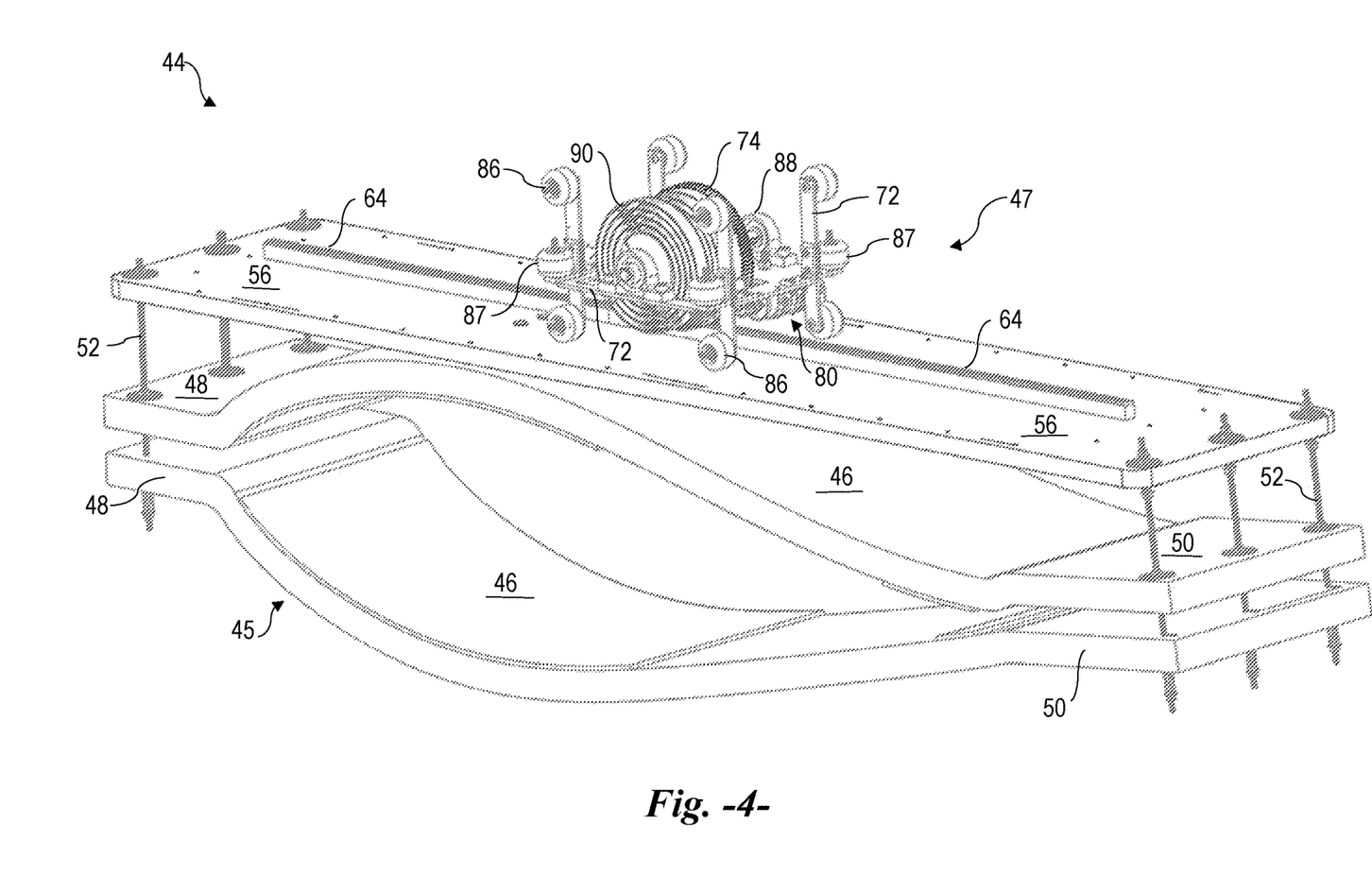
FIG. 4 is a more detailed perspective view of the tunable mass damper of FIG. 3.
Figure 5A:
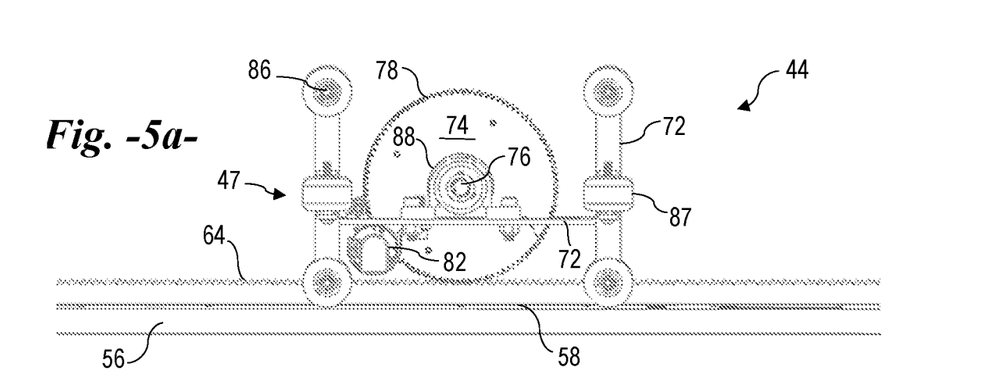
FIG. 5a is a side view of the mass damper of FIG. 4.
Figure 5B:
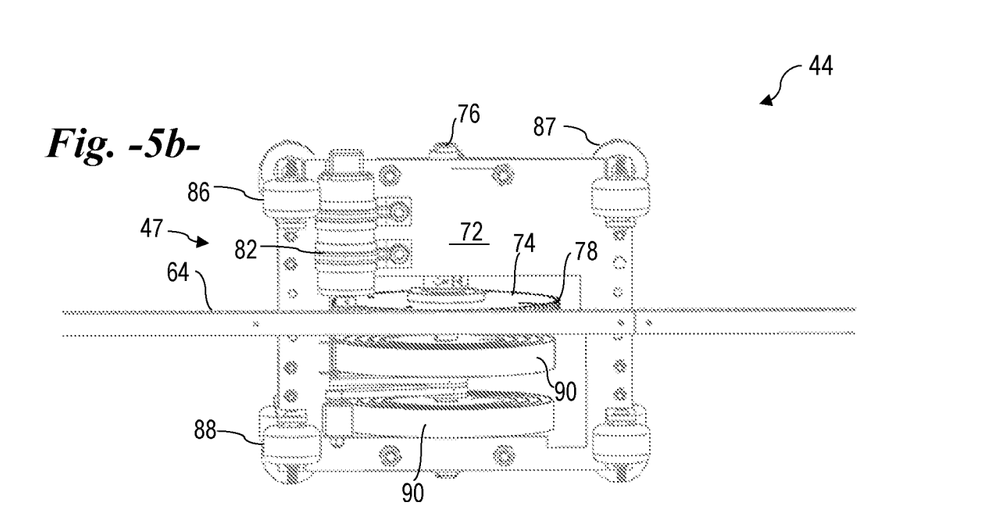
FIG. 5b is a bottom view of the mass damper of FIG. 4.
Figure 5C:
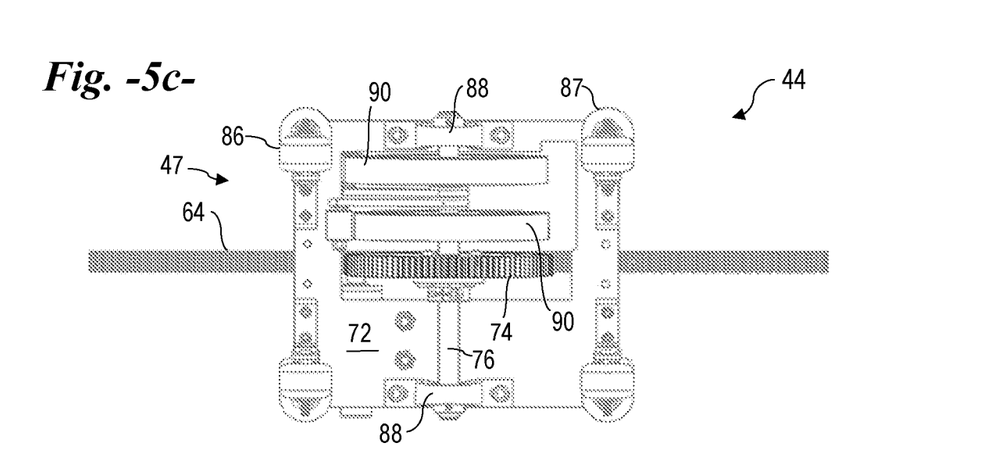
FIG. 5c is a top view of the mass damper of FIG. 4.

Referring to the perspective view of FIG. 4 and the various views of FIGS. 5a-5c and 6, an embodiment of a mass damper 44 in accordance with aspects of the invention is provided. The mass damper 44 is configured to reduce vibrations and loads in rotor blades during a non-operational mode of the wind turbine wherein the rotor hub in a locked or idling condition. The mass damper 44 is mounted to at least one, and preferably all, of the rotor blades (as discussed above) before or shortly after placing the wind turbine in the non-operational mode or during installation of the wind turbine. The mass damper 44 is tunable to an excitation frequency of the respective rotor blade or system frequencies as operating conditions experienced by the wind turbine change during the locked or idling condition, as explained in greater detail below.

The mass damper 44 includes a mass component 47 that moves along a stroke path within the mass damper 44. The term "mass component" is used herein to collectively refer to a mass of the totality of the components on a frame 72 (and is inclusive of the frame 72) that move along a track 64 within the mass damper 44, as described in more detail below.

The illustrated embodiment of the mass damper 44 includes a flywheel 74 that is in geared engagement with a rotation damper 80. The mass damper is tuned by controlling and changing a counter-torque exerted against rotation of the flywheel 74 by the rotation damper 80. This tuning function is accomplished automatically and wholly by the mass damper 44 via an internal electronic controller 100 (FIG. 6) at any time the mass damper 44 is mounted to a rotor blade 22. Thus, as environmental or operating conditions experienced by the wind turbine change during the non-operational mode resulting in a change in vibrations or oscillations induced in the blades, the mass damper 44 is effectively and automatically tuned to the change in the vibrations or oscillations.

The flywheel 74 is rotationally configured on a frame 72 that moves linearly along the chord-wise stroke path within the housing 54 relative to the rotor blade 22. The flywheel 74 is coupled to a shaft 76 that is supported for rotation by bearings 88. The flywheel 74 is in geared engagement with the first track gear 64 that may be mounted to the base 56, as particularly seen in FIG. 4. The track gear 64 extends longitudinally along the base 56 and effectively defines a length of the stroke path within the mass damper 44. The flywheel 74 has a geared outer circumferential surface 78 that meshes with the track gear 64. Thus, edge-wise vibrations or oscillations induced in the rotor blade cause the flywheel 74 (and mass component 47) to rotate and move linearly back-and-forth along the track gear 64. The mass damper 44 is automatically tuned by increasing or decreasing a counter-torque applied to the flywheel 74, as described below.

Although not illustrated in the figures, the flywheel 74 may also be in geared engagement with a second track gear mounted to an underside of the top 60 of the housing 54.

In the depicted embodiment, the flywheel 74 is geared directly to the track gear 64 (which may include an additional upper track gear). It should be appreciated that an intermediate gear may be used between the flywheel 74 and the track gear 64.

Figure 6:
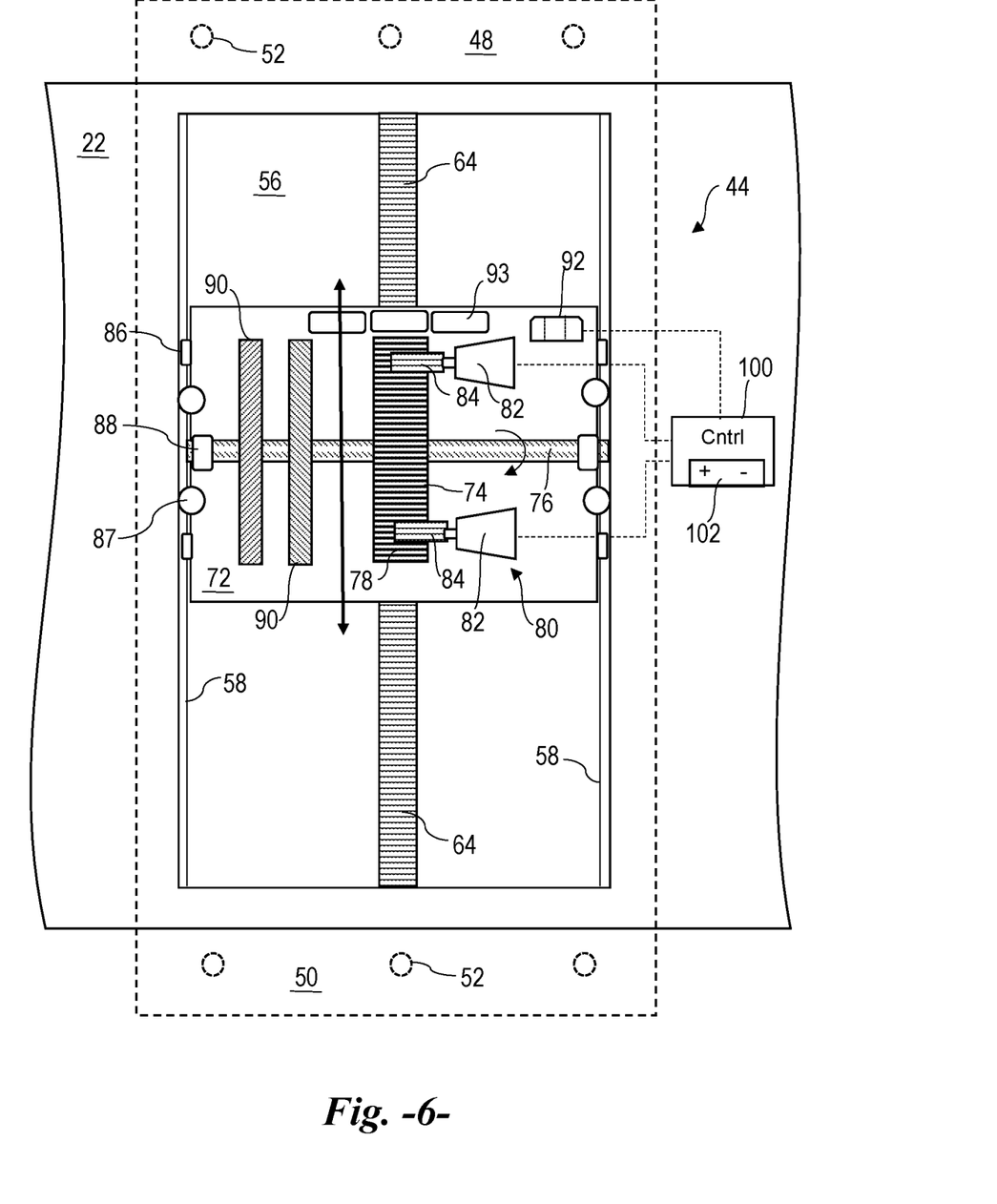
FIG. 6 is a top diagram view of an alternative embodiment of a tunable mass damper.

In addition to the weight of the components on (and including the frame 72), the mass component 47 may also include additional ballast weights 93 that can be added to or removed from the frame 72, as depicted in the embodiment of FIG. 6.

As mentioned, the frame 72 (with components fixed thereon) is movable along the track gear 64 (which may include an additional upper housing gear) within the housing 54. For this, the frame 72 may include a number of rollers 86 fixed thereto that ride along bottom runners 58 mounted on (or formed integral with) the base 56 and top runners 62 supported by or formed on the top 60 of the housing 56. Side rollers 87 may be mounted on the frame 72 to roll along the side walls 68 of the housing 54. Thus, the frame 72 may be supported for direct rolling engagement with the housing 54 and base 56 via the rollers 86, 87.

Oppositely-acting torsion springs 90 are provided to oppose the back-and-forth motion of the frame 72 (and attached components) relative to the track gears 64, 66, which also results in dampening of the blade vibrations and oscillations. One end of each spring 90 is fixed to the frame 72 and the other end of the spring 90 is fixed to the shaft 76. Thus, as the shaft 76 rotates in either direction, it "tightens" one of the torsion springs 90 to generate an opposing force against rotations of the shaft 76 (and thus rotation of the flywheel 74 fixed to the shaft 76).

The rotation damper 80 is mounted on the frame 72 and is in geared engagement (direct or indirect) with the flywheel 74. For example, the rotation damper may be in direct geared engagement with the outer circumferential surface 78 of the flywheel 74. The rotation damper 80 is "rotational" in that it is rotationally driven and produces a counter-torque that opposes rotation of the flywheel 74, this counter-torque being proportional to rotational velocity of the flywheel 74.

In a particular embodiment depicted in the figures, the rotation damper 80 includes at least one electrical generator 82 in geared engagement with (direct or indirect) and driven by the flywheel 74. In the depicted embodiment, the generator 82 is driven by a gear 84 that is also in engagement with the outer circumferential surface 78 of the flywheel 74. Thus, the generator 82 produces an electrical output (i.e., a current) that is directly proportional to the rotational velocity of the flywheel 74. The electrical output produces the counter-torque and, thus, the counter-torque is directly proportional to the rotational velocity of the flywheel 74.

It is a characteristic of electric generators that current from the generator produces a reaction torque (counter-torque) that, at a given load on the generator, is proportional to the magnitude of the current. Torque control of the generator works by changing the effective resistive load placed on the generator. This principle is utilized in the present invention to provide a remote electrical tuning capability to the mass damper 44.

Thus, by changing the effective resistive load on the generator 82 felt across the generator terminals, current (and thus counter-torque) produced by the generator 82 at a given rotational velocity of the flywheel 74 can be varied. A lower effective resistance leads to more current and more counter-torque, thus more damping capability of the mass damper 44. Controlling the effective resistance of the generator load effectively and automatically tunes the damping of the mass damper 44. Embodiments for varying the effective resistive load on the generator are discussed below with reference to FIG. 7.

In the embodiment of the mass damper 44 depicted in FIGS. 4 and 5a-5c, a single generator 82 is utilized to provide the tunable damping capability. It should be appreciated that that a plurality of generators 82 may be utilized to achieve a desired tuning capability within the constraints of available space on the frame 72. For example, in the embodiment depicted in FIG. 6, two generators 82 are engaged with the flywheel 74, with both generators 82 in communication with a common controller 100.

Referring to FIG. 6, the mass damper 44 (in particular, the mass component 47) has an effective stroke length in the chord-wise direction across the blade, wherein blade vibrations or oscillations of relatively lower amplitude result in a shorter stroke (shorter path of travel of the frame 72 on the track gear 64) and vibrations or oscillations of relatively greater amplitude result in a longer stroke of the mass component 47. Tuning the mass damper 44 to the stroke length is accomplished by changing the effective resistive load on the generator, as discussed above. Tuning of the device to limit the travel (i.e., stroke length) at higher vibration/oscillation amplitudes is an important safety feature so that travel of the mass component 47 does not exceed the available stroke path/length defined within the mass damper 44. On the other hand, it is desirable to tune the mass damper 44 to maximize its performance at lower amplitudes. Thus, the tuning scheme aims to increase stroke at lower amplitudes to maximize performance of the device, while limiting stroke at higher amplitudes to avoid damage to the mass damper 44. Thus, depending on the amplitude of the vibrations/oscillations induced in the rotor blade by the operating conditions experienced by the wind turbine, a desired stroke length is set or defined for the mass damper 44 to reduce the amplitude.

The mass damper 44 includes a dedicated onboard controller 100 to adjust or change the effective resistive load placed on the generator 82, thereby tuning the mass damper. Referring to FIG. 6, a sensor array 92 is provided on the frame 72 and is in communication with the controller 100. This array 92 may include one or more sensors. In a particular embodiment, three local sensors are configured in the array 92.

The first local sensor in the array 92 may be a position sensor configured to sense the instantaneous position of the mass component 47 along the track 64 to determine the current operating state of the mass damper 44. This is the main sensor used to provide feedback for the controller 100 to adjust the effective resistance on the generator. This first sensor may be, for example an incremental rotary encoder.

The second local sensor in the array 92 may be a neutral position sensor configured to provide a pulse (or other indication) at the neutral position of the mass component 47 corresponding to the middle of the stroke path. This sensor may be used as a check to ensure that the first sensor (e.g., encoder) is aligned correctly. If the encoder does not agree with the neutral position sensor, the encoder is reset to ensure a correct neutral position. This second sensor may be, for example, an inductive or hall effect sensor on the moving frame 72, and a magnet on the base 56. When the sensor travels over the magnet, a pulse is generated.

The third local sensor in the array 92 may be a limit position sensor, such as an inductive/hall effect sensor. This sensor is located on the mass component 47 (e.g., on the frame 72) in a way that does not respond to the neutral position sensor. The magnets for this third sensor are placed at the limits of the stroke path/length. If a pulse is detected from this sensor, action is taken to maximize the generator torque to oppose the motion because the moving frame is in danger of exceeding its design stroke.

Figure 7:
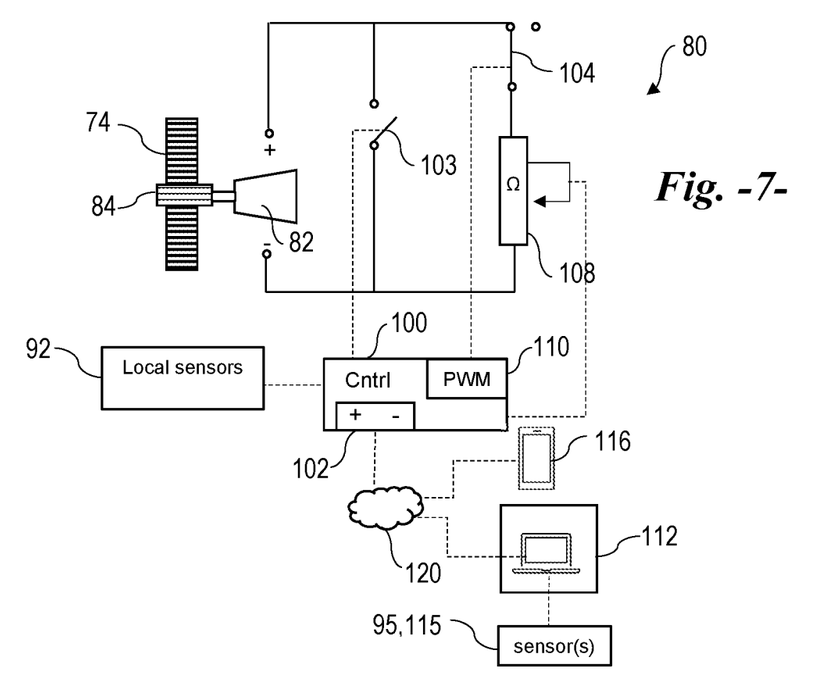
FIG. 7 is a control diagram for a tunable mass damper.

FIG. 7 is a simplified circuit diagram that depicts control aspects of the rotation damper 80, particularly the generator 82. The generator 82 is engaged with the flywheel 74 via the gear 84. An effective resistive load 108 is selectively placed across the generator 82 and controlled by the controller 100 (which may be a conventional PID controller).

In one embodiment, a circuit is establishes across the generator terminals. The circuit includes a resistive load 108 (which may be fixed/non-variable). A relay 104 is used to alternately place/remove this resistor 108 from the circuit. When the resistor 108 is placed across the generator terminals, the generator 82 produces an output current, which results in the counter-torque discussed above. This counter-torque is proportional to the generator output (current). A pulse width modulation (PWM) module 110 is used to alternately open and close the relay 104. The controller 100 adjusts the duty cycle of the PWM module 110 to control the amount of time the resistor 108 is placed in the circuit. Thus, an increased duty cycle (frequency) of the relay 104 results in an increase of the generator output and, thus, an increase in the counter-torque applied to the flywheel. Even though the resistor 108 may have a fixed resistance value, the effective resistance seen by the generator is varied by changing the duty cycle of the PWM module 110.

In an alternate embodiment, the resistive load 108 may be a variable load, such as a variable resistor indicated by the arrow in FIG. 7 or a resistor branch circuit wherein multiple resistors are variably combined to change the effective resistive value placed on the generator 82. The PID controller 100 may directly control the rheostat or resistor branch circuit to change the effective resistive load 108 placed on the generator 82 by altering the actual resistive value of the load 108.

The controller 100 receives position data via the sensor array 92 and controls the effective resistive load 108 (by controlling the variable resistor or the duty cycle of the PWM) in an open or closed feedback loop to control the counter-torque produced by the generator 82 as a function of stroke length of the mass component 47.

The circuit across the generator 82 may include a bypass relay 103 controlled by the controller 100 for relatively infrequent low voltage operation wherein a maximum amount of counter-torque is required.

Still referring to FIG. 7, as mentioned, the controller 100 may be an individual dedicated controller configured within the housing 54 for each individual mass damper 44. The controller 100 may have a dedicated power supply, such as a rechargeable battery 102, or in an alternate embodiment may be supplied with power from a source in the wind turbine.

The controller 100 may be in communication with a remotely located central controller 112 (directly or via the wind turbine controller 24) for receipt or exchange of control commands or data therewith. For example, the central controller 112 may generate control commands to change certain operating parameters of the mass damper 44, such as the stroke length, response characteristics of the mass damper, power modes, duty cycle of the PWM, etc. The controller 100 may be in communication with a mobile hand-held controller 116 (e.g., a mobile smart device) directly or via an intermediary controller. The mobile controller 116 may run an application that allows an operator to monitor operation of the mass damper 44 and/or control the operating parameters thereof. In the depicted embodiment, the mobile controller 116 and the central controller 112 may be in direct communication with the mass damper controller 100 via a wireless network 120. The mass damper 44 would, in this case, also include wireless transmission and reception capability.

Figure 8:
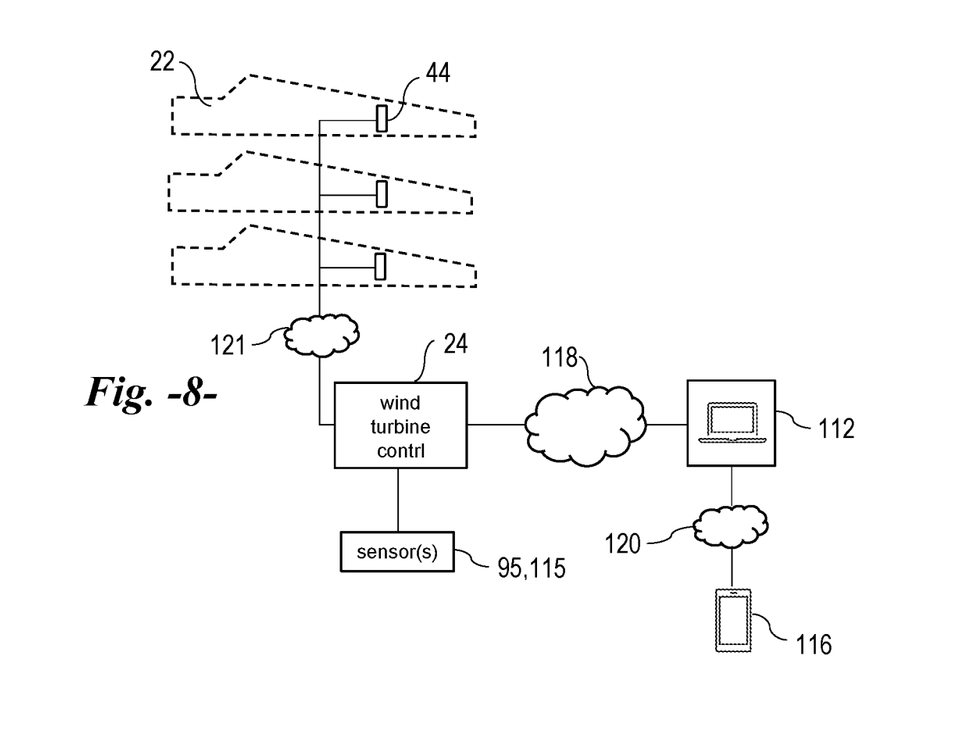
FIG. 8 is a control diagram for a wind turbine utilizing multiple tunable mass dampers.

FIG. 8 depicts a control scheme wherein each rotor blade 22 of the wind turbine has one of the mass dampers 44 mounted thereon. Each damper 44 may have its own dedicated controller 100 in communication with the wind turbine controller 24 via a wireless network 121 or a wired connection. The wind turbine controller 24 may, in turn, be in communication with the central controller 112 via a wireless network 118. The mobile smart device 116 may be in direct communication with the wind turbine controller 24 or via the central controller 112 (and wireless network 120).

It should be appreciated that various control schemes and architecture may be utilized to provide the automatic tuning capability for the mass dampers 44 on the rotor blades 22 and remote adjustment or monitoring of the operating state or parameters of the mass dampers 44.

In certain embodiments, one or more sensors 95, 115 located on the blades 22 or other static locations of the wind turbine may be utilized to provide data indicative of vibrations or oscillations induced in the rotor blades during the locked or idling state of the rotor 18. The oscillations or vibrations may be detected or measured directly by displacement sensors 95 (e.g., accelerometers or strain gauges) located directly on the rotor blades. A vibration of a blade may be determined when the strain or deformation parameter satisfies a strain or deformation threshold, which may be determined by the controller 100 (or any of the other controllers 112, 116).

The sensors 95, 115 may be in communication with the central controller 112 directly or via the wind turbine controller 24, as depicted in FIGS. 7 and 8. In order to conserve the internal power supply (e.g, battery 102) in the mass dampers 44, it may be desired that the devices 44 are placed in a low-power sleep mode until the vibrations or oscillations induced in the blades reaches a threshold level as determined by the central controller 112 based on the data from the sensors 95, 115. Once this threshold is met, the central controller 112 may issue a "turn on" command to the mass dampers 44 directly or via the wind turbine controller 24.

Alternatively, the oscillations or vibrations may be predicted or inferred based on data from sensors disposed on the wind turbine to measure wind speed, wind direction, yaw position of the rotor hub, etc. For this, the wind turbine may include one or more wind parameter sensors 115 (FIG. 1) for measuring various wind parameters upwind of the wind turbine. The actual wind parameter(s) may be any one or combination of the following: wind gust, wind speed, wind direction, wind acceleration, wind turbulence, wind shear, wind veer, wake, wind up-flow, or similar. Further, the one or more sensors 115 may include at least one LIDAR sensor for measuring upwind parameters. The LIDAR sensors may be located on the wind turbine tower 12, on one or more of the wind turbine blades 22, on the nacelle 16, one a meteorological mast of the wind turbine, or at any other suitable location. In still further embodiments, the wind parameter sensor 115 may be located in any suitable location near the wind turbine 10. The sensors 115 may be configured to measure a wind parameter ahead of at least one specific portion, typically the most significant sections of the blades 22 in terms of contributions of those sections to aerodynamic torque on the blades 22. These sections may include, for example, sections close to the tip of the blade.

Further aspects of the invention are provided by the subject matter of the following clauses:

Clause 1. A method for reducing vibrations and loads in one or more rotor blades on a rotor hub of a wind turbine when the rotor hub is in a locked or idling condition, the method comprising: attaching a mass damper at a fixed location on one or more of the rotor blades; maintaining the mass damper on the rotor blades during the locked or idling condition of the rotor hub; and wherein the mass damper includes a movable mass component responsive to changes in vibrations or oscillations induced in the rotor blades during the locked or idling condition of the rotor hub.

Clause 2. The method according to clause 1, wherein the mass damper is automatically tunable to an excitation frequency of the rotor blade or a system frequency during the locked or idling condition.

Clause 3. The method according to any one of clauses 1-2, wherein the step of attaching the mass damper comprises fixing clamping shells over the rotor blade at the fixed location, the clamping shells conforming to a shape of pressure side and suction side surfaces of the rotor blade and extending beyond a leading and trailing edge of the rotor blade in a chord-wise direction, the mass damper attached to one of the clamping shells.

Clause 4. The method according to any one of clauses 1-3, wherein the mass damper includes a flywheel in geared engagement with a rotation damper, the step of remotely tuning the mass damper comprising controlling a counter-torque exerted against rotation of the flywheel by the rotation damper.

Clause 5. The method according to any one of clauses 1-4, wherein the mass damper includes a frame that is movable linearly along a chord-wise stroke length relative to the rotor blade, the flywheel coupled to a shaft and in geared engagement with a track gear so as to be rotationally driven as the frame moves along the stroke length, the rotation damper mounted on the frame and in geared engagement with an outer circumferential surface of the flywheel, wherein the counter-torque exerted by the rotation damper is proportional to a rotational velocity of the flywheel.

Clause 6. The method according to any one of clauses 1-5, wherein the mass damper includes a ballast weight mounted to the frame.

Clause 7. The method according to any one of clauses 1-6, wherein the frame and the track gear are configured within a housing, the housing stationarily fixed on the rotor blade.

Clause 8. The method according to any one of clauses 1-7, wherein the flywheel is geared directly to the track gear.

Clause 9. The method according to any one of clauses 1-8, wherein the rotation damper includes an electrical generator in geared engagement with and driven by the flywheel, wherein an electrical output of the generator is directly proportional to the rotational velocity of the flywheel and produces the counter-torque.

Clause 10. The method according to any one of clauses 1-9, wherein the rotation damper is tuned by varying a resistive electrical load placed on the generator to change the counter-torque exerted by the generator at a given rotational speed of the flywheel.

Clause 11. A wind turbine configured for reducing vibrations and loads in rotor blades during a non-operational mode of the wind turbine, comprising: a plurality of rotor blades on a rotor hub; in the non-operational mode of the wind turbine with the rotor hub in a locked or idling condition, the wind turbine further comprising a mass damper attached at a fixed location on one or more of the rotor blades; and wherein the mass damper comprises a movable mass component that is responsive to changes in vibrations or oscillations in the rotor blades during the locked or idling condition of the rotor hub.

Clause 12. The wind turbine according to clause 11, wherein the mass damper is configured to automatically tune to an excitation frequency of the rotor blade or a system frequency as the vibrations or oscillations in the rotor blades change.

Clause 13. The wind turbine according to any one of clauses 11-12, comprising an attachment system that removably attaches the mass damper to the rotor blade, the attachment system comprising clamping shells placed over the rotor blade at the fixed location, the clamping shells conforming to a shape of pressure side and suction side surfaces of the rotor blade and extending beyond a leading and trailing edge of the rotor blade in a chord-wise direction, the mass damper attached to one of the clamping shells.

Clause 14. The wind turbine according to any one of clauses 11-13, wherein the mass damper comprises a flywheel in geared engagement with a rotation damper, wherein the rotation damper exerts an adjustable counter-torque on the flywheel that is proportional to a rotational velocity of the flywheel.

Clause 15. The wind turbine according to any one of clauses 11-14, wherein the mass damper includes a frame that is movable linearly along a chord-wise stroke length relative to the rotor blade, the flywheel in geared engagement with a track gear and rotationally driven as the frame moves along the stroke length, the rotation damper mounted on the frame and in geared engagement with the flywheel, wherein the counter-torque exerted by the rotation damper is proportional to a rotational velocity of the flywheel.

Clause 16. The wind turbine according to any one of clauses 11-15, wherein the mass damper comprises a ballast weight mounted to the frame.

Clause 17. The wind turbine according to any one of clauses 11-16, wherein the frame and the track gear are configured within a housing, the housing stationarily fixed on the rotor blade.

Clause 18. The wind turbine according to any one of clauses 11-17, wherein the rotation damper comprises an electrical generator in geared engagement with and driven by the flywheel, wherein an electrical output of the generator is directly proportional to the rotational velocity of the flywheel and produces the counter-torque.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing vibrations and loads in one or more rotor blades on a rotor hub of a wind turbine when the rotor hub is in a locked or idling condition, the method comprising:
    attaching a mass damper at a fixed location on one or more of the rotor blades, wherein attaching the mass damper comprises fixing clamping shells over the rotor blade at the fixed location, the clamping shells conforming to a shape of pressure side and suction side surfaces of the rotor blade and extending beyond leading and trailing edges of the rotor blade in a chord-wise direction, the mass damper attached to one of the clamping shells; and
    maintaining the mass damper on the rotor blades during the locked or idling condition of the rotor hub,
    wherein the mass damper includes a movable mass component responsive to changes in vibrations or oscillations induced in the rotor blades during the locked or idling condition of the rotor hub.

2. The method according to claim 1, wherein the mass damper is automatically tunable responsive to the changes in the vibrations or oscillations.

3. The method according to claim 1, wherein the mass damper includes a flywheel in geared engagement with a rotation damper, the step of remotely tuning the mass damper comprising controlling a counter-torque exerted against rotation of the flywheel by the rotation damper.

4. The method according to claim 3, wherein the mass damper includes a frame that is movable linearly along a chord-wise stroke length relative to the rotor blade, the flywheel coupled to a shaft and in geared engagement with a track gear so as to be rotationally driven as the frame moves along the stroke length, the rotation damper mounted on the frame and in geared engagement with an outer circumferential surface of the flywheel, wherein the counter-torque exerted by the rotation damper is proportional to a rotational velocity of the flywheel.

5. The method according to claim 4, wherein the mass damper includes a ballast weight mounted to the frame.

6. The method according to claim 4, wherein the frame and the track gear are configured within a housing, the housing stationarily fixed on the rotor blade.

7. The method according to claim 6, wherein the flywheel is geared directly to the track gear.

8. The method according to claim 4, wherein the rotation damper includes an electrical generator in geared engagement with and driven by the flywheel, wherein an electrical output of the generator is directly proportional to the rotational velocity of the flywheel and produces the counter-torque.

9. The method according to claim 8, wherein the rotation damper is tuned by varying a resistive electrical load placed on the generator to change the counter-torque exerted by the generator at a given rotational speed of the flywheel.

10. A wind turbine, comprising:
    a rotor hub;
    a plurality of rotor blades secured to the rotor hub;
    a mass damper removably secured to a respective rotor blade of the plurality of rotor blades via an attachment system, the mass damper comprising a movable mass component, the attachment system comprising clamping shells placed over the respective rotor blade at a fixed location, the clamping shells conforming to a shape of pressure side and suction side surfaces of the respective rotor blade and extending beyond leading and trailing edges of the respective rotor blade in a chord-wise direction,
    wherein, in a non-operational mode of the wind turbine with the rotor hub in a locked or idling condition, the movable mass component of the mass damper is responsive to changes in vibrations or oscillations in one or more of the plurality of rotor blades during the locked or idling condition of the rotor hub.

11. The wind turbine according to claim 10, wherein the mass damper is configured to automatically tune to an excitation frequency of the respective rotor blade or a system frequency as the vibrations or oscillations change.

12. The wind turbine according to claim 10, wherein the mass damper comprises a flywheel in geared engagement with a rotation damper, wherein the rotation damper exerts an adjustable counter-torque on the flywheel that is proportional to a rotational velocity of the flywheel.

13. The wind turbine according to claim 12, wherein the mass damper comprises a frame that is movable linearly along a chord-wise stroke length relative to the respective rotor blade, the flywheel in geared engagement with a track gear and rotationally driven as the frame moves along the stroke length, the rotation damper mounted on the frame and in geared engagement with the flywheel, wherein the counter-torque exerted by the rotation damper is proportional to a rotational velocity of the flywheel.

14. The wind turbine according to claim 13, wherein the mass damper comprises a ballast weight mounted to the frame.

15. The wind turbine according to claim 13, wherein the frame and the track gear are configured within a housing, the housing stationarily fixed on the respective rotor blade.

16. The wind turbine according to claim 12, wherein the rotation damper comprises an electrical generator in geared engagement with and driven by the flywheel, wherein an electrical output of the generator is directly proportional to the rotational velocity of the flywheel and produces the counter-torque.

* * * * *